United States Patent
Ross, Jr. et al.

(10) Patent No.: US 7,997,132 B2
(45) Date of Patent: Aug. 16, 2011

(54) CAPACITIVE SENSOR ASSEMBLY FOR DETERMINING RELATIVE POSITION

(75) Inventors: Herbert G. Ross, Jr., Argyle, TX (US); Carl Alan Taylor, Frisco, TX (US)

(73) Assignee: Rochester Gauges, Inc., Dallas, TX (US)

( * ) Notice: Subject to any disclaimer, the term of this patent is extended or adjusted under 35 U.S.C. 154(b) by 415 days.

(21) Appl. No.: 12/135,421

(22) Filed: Jun. 9, 2008

(65) Prior Publication Data

US 2009/0301190 A1 Dec. 10, 2009

(51) Int. Cl.
*G01F 23/26* (2006.01)
(52) U.S. Cl. ............... 73/304 C; 73/290 B; 73/290 R; 73/304 R
(58) Field of Classification Search ......... 73/290 B, 73/290 R, 290 V, 304 C, 304 R
See application file for complete search history.

(56) References Cited

U.S. PATENT DOCUMENTS

| | | | | |
|---|---|---|---|---|
| 2,511,649 A * | 6/1950 | Reiter | ............... | 73/297 |
| 2,955,466 A | 10/1960 | Coles | | |
| 3,184,970 A * | 5/1965 | McNelly | ............... | 73/304 R |
| 3,216,255 A * | 11/1965 | McFarlane | ............... | 73/290 R |
| 3,277,711 A | 10/1966 | Roberge | | |
| 3,665,209 A * | 5/1972 | Webb et al. | ............... | 307/118 |
| 3,862,571 A * | 1/1975 | Vogel | ............... | 73/304 C |
| 3,864,974 A | 2/1975 | Rauchwerger | | |
| 3,901,079 A * | 8/1975 | Vogel | ............... | 73/304 C |
| 3,935,970 A | 2/1976 | Spaw | | |
| 3,991,614 A * | 11/1976 | Ditzler | ............... | 73/215 |
| 4,056,978 A * | 11/1977 | Zimmermann | ............... | 73/304 R |
| 4,119,860 A * | 10/1978 | Gooley | ............... | 250/577 |
| 4,122,718 A | 10/1978 | Gustafson | | |
| 4,142,415 A * | 3/1979 | Jung et al. | ............... | 73/304 C |
| 4,184,369 A * | 1/1980 | Jung et al. | ............... | 73/304 C |
| 4,194,395 A * | 3/1980 | Wood | ............... | 73/304 C |
| 4,201,085 A | 5/1980 | Larson | | |
| 4,226,118 A | 10/1980 | Aldrich | | |
| 4,382,382 A * | 5/1983 | Wang | ............... | 73/304 R |
| 4,383,443 A * | 5/1983 | Langdon | ............... | 73/290 V |
| 4,417,472 A * | 11/1983 | Tward | ............... | 73/304 C |
| 4,567,762 A | 2/1986 | Hopper et al. | ............... | 73/304 R |
| 4,589,281 A | 5/1986 | Aldrich | | |
| 4,637,254 A * | 1/1987 | Dyben et al. | ............... | 73/314 |
| 4,720,997 A | 1/1988 | Doak et al. | ............... | 73/295 |
| 4,757,252 A | 7/1988 | Maltby et al. | ............... | 324/687 |
| 4,845,986 A * | 7/1989 | Hayashi et al. | ............... | 73/290 R |
| 4,879,902 A | 11/1989 | Loniello | ............... | 73/304 R |
| 5,051,921 A | 9/1991 | Paglione | ............... | 702/52 |
| RE34,731 E | 9/1994 | Lee et al. | ............... | 73/304 C |

(Continued)

FOREIGN PATENT DOCUMENTS

DE 3203175 A1 * 8/1983

*Primary Examiner* — David A. Rogers
(74) *Attorney, Agent, or Firm* — Alvin R. Wirthlin

(57) ABSTRACT

A capacitive sensor assembly for detecting relative movement or position between objects, such as liquid level in a tank or reservoir, movement of one machine component with respect to another, and so on, includes one or more antenna probes connected to an integrated chip normally associated with touch-screen displays. Each antenna probe operates independently and may be formed as insulated conductive wires or conductive traces between layers of a stiff or flexible substrate, such as a PCB, with the substrate material serving as the insulating layers. Each antenna probe has a different length representing different measurement positions or locations between the objects being measured to provide dynamic calibration of the measurement under changing environmental conditions.

18 Claims, 8 Drawing Sheets

U.S. PATENT DOCUMENTS

| | | |
|---|---|---|
| 5,400,651 A | 3/1995 | Welch |
| 5,424,649 A | 6/1995 | Gluck et al. |
| 6,095,178 A | 8/2000 | Gilbert et al. .................. 137/199 |
| 6,178,818 B1 | 1/2001 | Plochinger ................... 73/304 C |
| 6,269,694 B2 | 8/2001 | Morimoto ....................... 73/305 |
| 6,334,360 B1 | 1/2002 | Chen ........................ 73/304 R |
| 6,380,750 B1 | 4/2002 | Schenck et al. ............... 324/690 |
| 6,677,891 B2 | 1/2004 | Fehrenbach et al. |
| 6,842,018 B2 | 1/2005 | McIntosh |
| 6,857,313 B2 | 2/2005 | Williamson |
| 6,904,789 B2 | 6/2005 | Campbell et al. |
| 6,923,057 B2 | 8/2005 | Sabatino ........................ 73/313 |
| 6,938,479 B2 | 9/2005 | Carpenter et al. |
| 7,114,391 B2 | 10/2006 | Sasaki et al. |
| 7,219,545 B2* | 5/2007 | Salzmann et al. .......... 73/304 R |
| 7,307,485 B1 | 12/2007 | Snyder et al. |
| 7,661,307 B1* | 2/2010 | Milone ....................... 73/304 R |
| 7,739,907 B2* | 6/2010 | Boiarski ......................... 73/149 |
| 2001/0037680 A1* | 11/2001 | Buck et al. .................. 73/304 C |
| 2002/0124643 A1 | 9/2002 | Robinson .................... 73/290 R |
| 2007/0056367 A1* | 3/2007 | Rumpf ....................... 73/290 R |
| 2007/0240506 A1* | 10/2007 | Lin .............................. 73/304 R |
| 2008/0053202 A1* | 3/2008 | Rohklin et al. .............. 73/61.41 |

\* cited by examiner

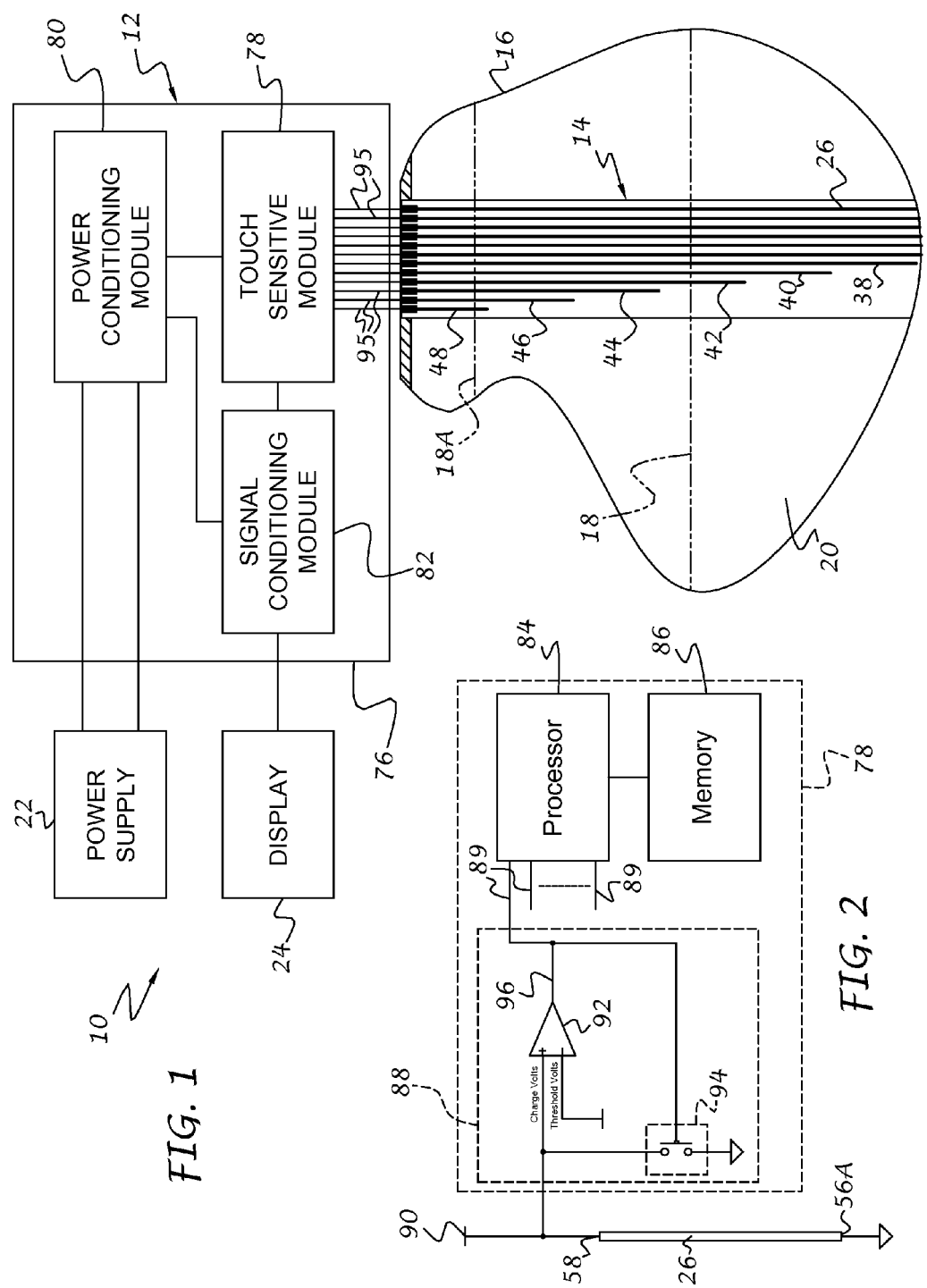

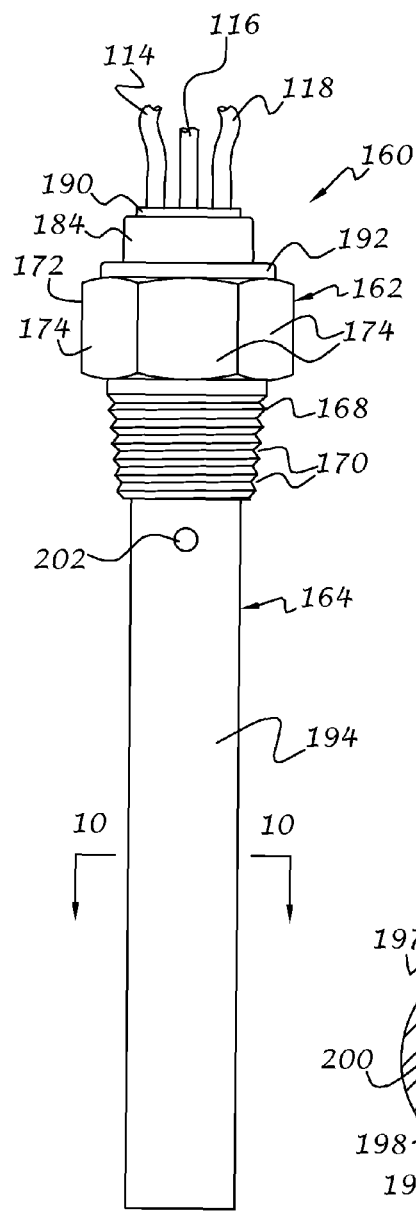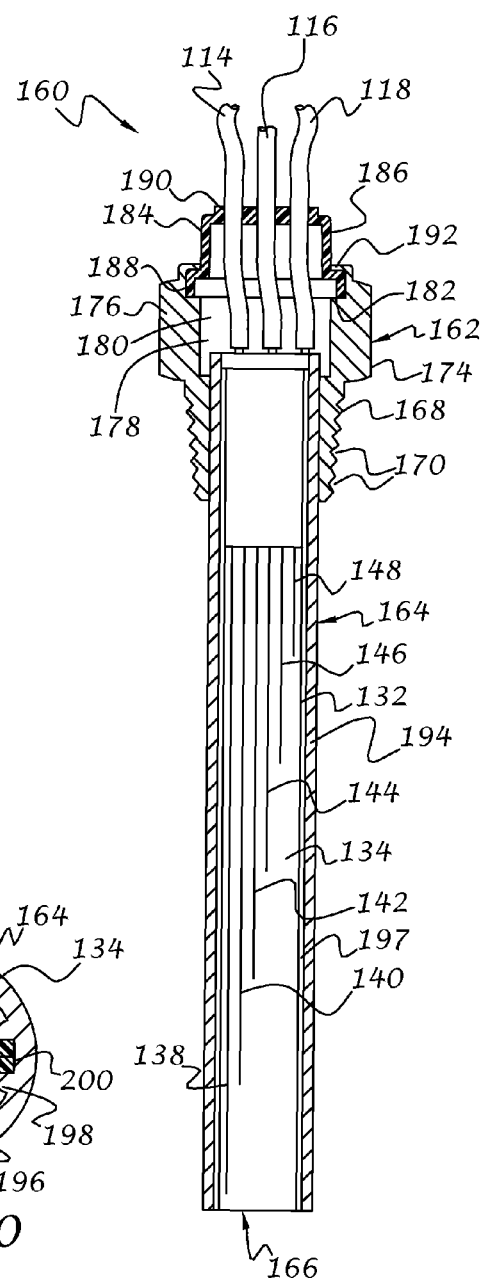
FIG. 10
FIG. 9
FIG. 11

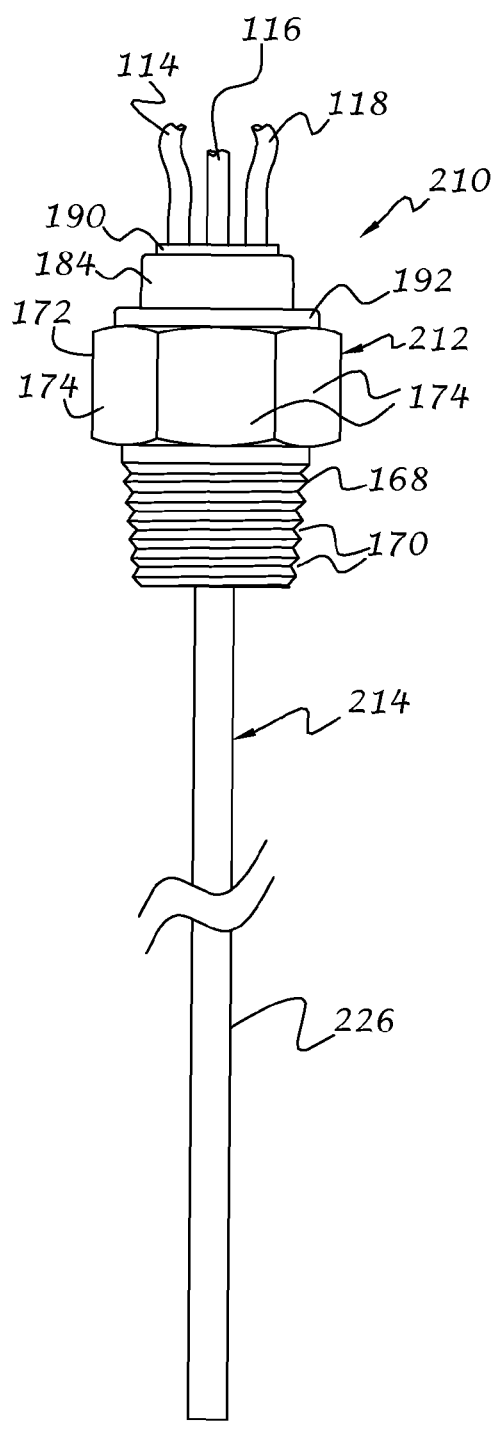
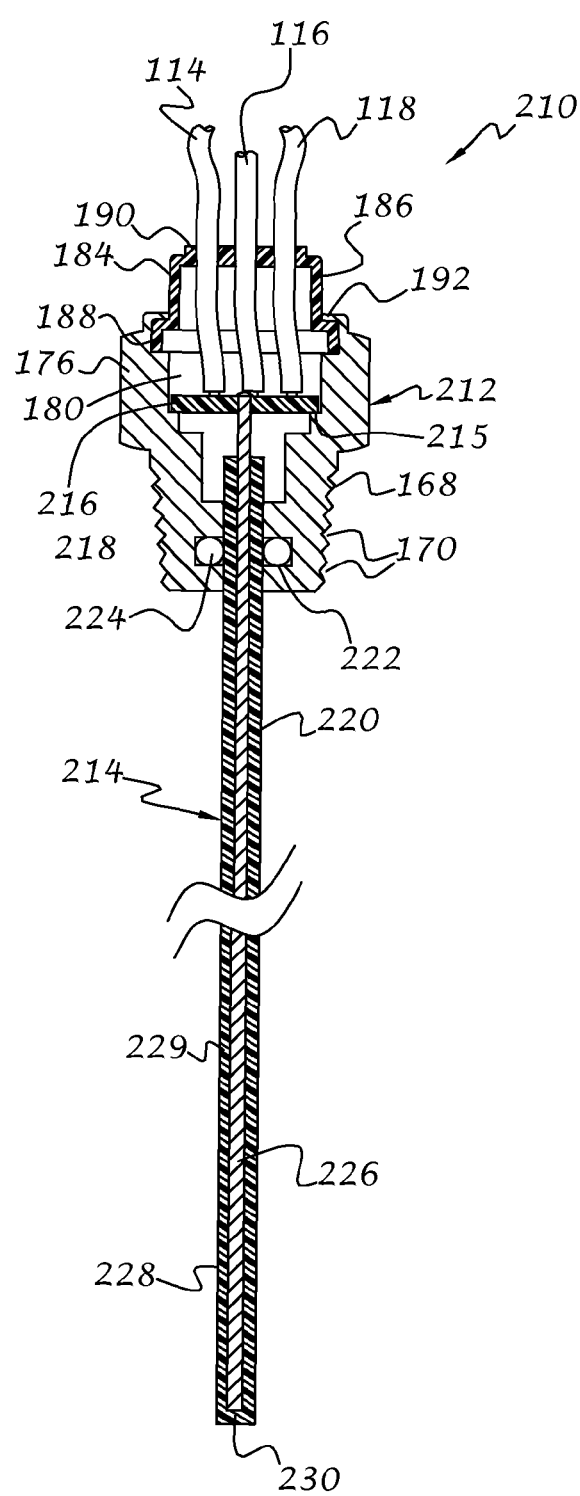
FIG. 12
FIG. 13

CAPACITIVE SENSOR ASSEMBLY FOR DETERMINING RELATIVE POSITION

CROSS REFERENCE TO RELATED APPLICATIONS

This application is related to U.S. application Ser. No. 12/135,359 and U.S. application Ser. No. 12/135,392 filed on even date herewith, the disclosures of which are hereby incorporated by reference.

BACKGROUND OF THE INVENTION

This invention relates to capacitive sensors, and more particularly to variable capacitance sensors for determining relative position or movement between objects, such as movement of liquid within a tank, movement of one machine component with respect to another machine component, as well as other measurable parameters.

Transducers for measuring liquid level, linear or angular position and movement, pressure, torque, and the like, are often used in vehicles, industrial equipment and other systems and components. The electrical output of such transducers changes in response to a change in the component being measured. The electrical output is typically in the form of a change in resistance, capacitance, current flow, magnetic field, and frequency. These types of transducers may include variable capacitors or resistors, optical components, Hall Effect sensors, strain gauges, ultrasonic devices, and so on.

By way of example, prior art liquid level sensors, such as fuel sensors for motor vehicles, usually include a float that rides on an upper surface of the fuel in a fuel tank. The float is typically connected to one end of a pivot arm while the other end of the pivot arm typically includes a wiper mechanism that brushes against a resistor strip when the arm is rotated due to a change in fuel level in the tank. Such sensors are prone to wear, mechanical and/or electrical breakdown or inaccurate liquid level detection. Although variable capacitance probes have been developed to overcome these drawbacks, they are cost-prohibitive in many applications and are typically limited to measuring a certain type of liquid, since different liquids will have different dielectric properties.

In addition, a variable capacitance probe designed to measure fuel level normally cannot be used for measuring water level due to the different dielectric properties associated with different liquids. For example, the dielectric constant at room temperature of a vacuum is one, of air is close to one, of gasoline is about two, of industrial alcohol is anywhere from 16-31, and of water is about 80. Since capacitance is directly dependent on the dielectric constant, a transducer designed for measuring the level of one type of liquid could not be relied upon for measuring other types of liquids. However, even when the transducer is designed for measuring only one type of liquid, such as gasoline, the dielectric constant can change due to different gasoline formulations, the presence of water, alcohol, detergents, additives, as well as environmental factors such as temperature, pressure and humidity, thus leading to significant measurement inaccuracies.

In order to overcome these challenges, the prior art has suggested compensation means in the form of a reference capacitor at the bottom of the tank, which must always be immersed in the liquid being measured. The reference capacitor includes a pair of spaced plates and the liquid being measured serves as the dielectric between the plates. A dielectric constant of the liquid can then be determined and used to offset the capacitance of the liquid level sensor to compensate for dielectric variations. However, this type of solution only takes into account changes in dielectric at the bottom of the tank since it is assumed that the liquid is uniform throughout it's volume. In reality, since some liquids have a greater density than others, there may be a separation of fluids at different depths that cannot be discerned by a single reference capacitor. For example, the reference capacitor may be exposed to water or other contaminants at the bottom of a fuel tank which may lead to inaccurate dielectric compensation.

In many applications, such as all-terrain vehicles, motorcycles, snowmobiles, and the like, tanks are typically formed with curved side walls to fit around the engine and/or other components of the vehicle. In such circumstances, prior art fuel sensors are usually inadequate to accommodate these shapes while accurately measuring fuel level. In addition, many tanks are constructed without the provision of openings or mounting hardware for accommodating a liquid level sensor. In other circumstances, it may be difficult or impractical to penetrate the tank with a liquid level sensor.

In addition, the electronics associated with capacitive measurement and compensation are relatively expensive and are thus priced out of markets where there is a long-felt need for low-cost yet highly accurate liquid level transducers and other sensors for measuring relative position and/or movement between objects.

BRIEF SUMMARY OF THE INVENTION

According to one aspect of the invention, a capacitive sensor assembly for measuring relative position between first and second objects includes an electronics section and a probe section. The electronics section has a touch-sensitive module that is capable of receiving and processing signals from a capacitive touch device. The probe section has at least one antenna probe connected to the electronics section. The antenna probe includes an elongate electrical conductor and an insulating layer covering at least a portion of the electrical conductor. With this arrangement, a change in detected capacitance of the at least one antenna probe is reflective of a change in relative movement or position between the first and second objects. The movement or position between the objects can be quantified as liquid level in a tank or reservoir, linear or angular movement of one machine component with respect to another machine component, as well as other measurable parameters.

According to a further aspect of the invention, a capacitive sensor assembly for measuring relative position or movement between first and second objects includes a probe section comprising a plurality of independently operating antenna probes of different lengths. Each antenna probe includes offset tip portions representing discrete measurement positions. The sensor assembly further includes an electronics section operably associated with the probe section for measuring changes in capacitance of each antenna probe to thereby detect the relative position or movement.

BRIEF DESCRIPTION OF THE DRAWINGS

The foregoing summary as well as the following detailed description of the preferred embodiments of the present invention will be best understood when considered in conjunction with the accompanying drawings, wherein like designations denote like elements throughout the drawings, and wherein:

FIG. 1 is a schematic diagram illustrating a capacitive transducer in accordance with the present invention operably associated with a tank;

FIG. 2 is a schematic view of a portion of a touch sensitive module that forms part of the capacitive transducer of FIG. 1;

FIG. 9 is a front elevational view of a capacitive sensor assembly in accordance with another embodiment of the invention;

FIG. 10 is an enlarged sectional view of the sensor assembly taken along line 10-10 of FIG. 9;

FIG. 11 is a longitudinal sectional view of the sensor assembly of FIG. 9;

FIG. 12 is a front elevational view of a capacitive sensor assembly in accordance with yet another embodiment of the invention;

FIG. 13 is a longitudinal sectional view of the sensor assembly of FIG. 12;

Figure 3:
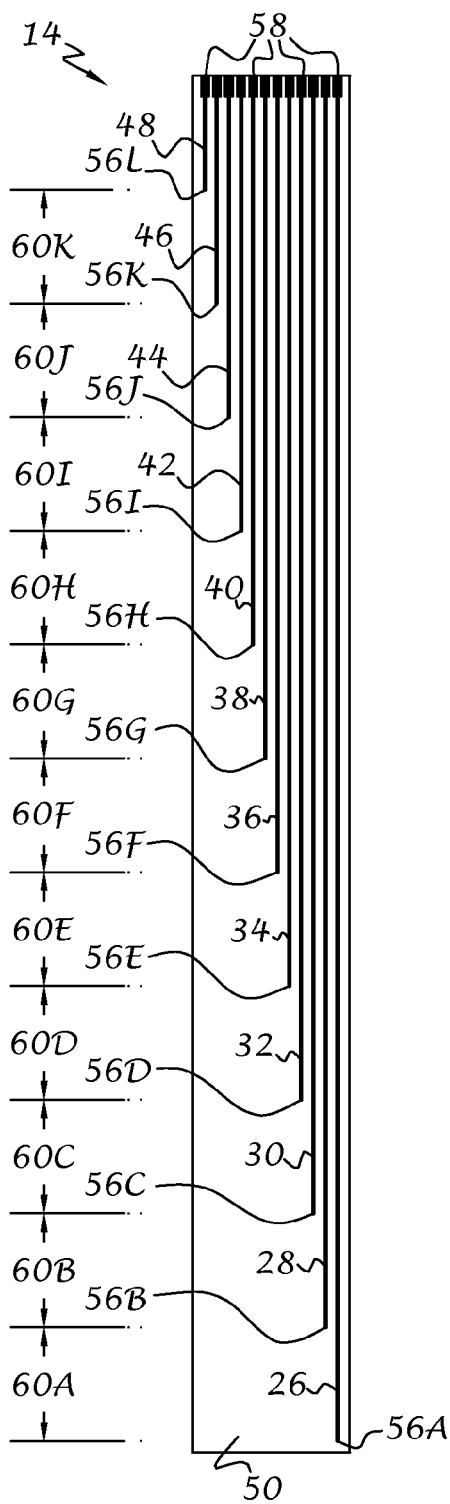
FIG. 3 is a front elevational view of a probe section of the capacitive transducer in accordance with one exemplary embodiment of the invention.

It is noted that the drawings are intended to depict only typical embodiments of the invention and therefore should not be considered as limiting the scope thereof. It is further noted that the drawings are not necessarily to scale. The invention will now be described in greater detail with reference to the accompanying drawings.

DETAILED DESCRIPTION OF THE INVENTION

Referring to the drawings, and to FIG. 1 in particular, a capacitive transducer 10 in accordance with an exemplary embodiment of the present invention is illustrated. The capacitive transducer 10 preferably includes an electronics section 12 and a probe section 14 that electrically interfaces with the electronics section. The probe section 14 is adapted for mounting inside or outside a tank 16, vessel or other container for measuring a level, as denoted by numerals 18 and 18A, of a fluent material 20 within the container. The electronics section 12 is preferably powered by an external power supply 22 and sends appropriate signals to an external display 24 or other interface, such as control circuitry (not shown) for controlling inflow and outflow of material, upon determination of material level within the container. The fluent material 20 to be measured can be in the form of liquid or granular materials. Practical applications of this invention include, but are not limited to, the measurement of water, fuel, oil, coolant, and other liquid levels in motorized vehicles and stationary equipment and systems, the measurement of granular materials within storage bins, and so on.

Figure 4:
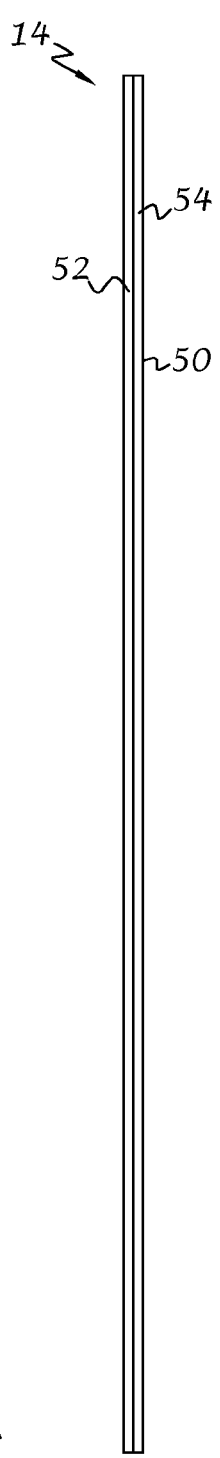
FIG. 4 is a side elevational view of the probe section.

Referring now to FIGS. 3 and 4, the probe section 14 in accordance with an exemplary embodiment of the invention preferably includes a primary antenna probe 26 and a plurality of secondary antenna probes 28, 30, 32, 34, 36, 38, 40, 42, 44, 46, and 48 formed as elongate electrically conductive electrodes or traces on an elongate electrically insulating substrate 50. The primary probe 26 is preferably constantly immersed in the material being measured while the secondary probes are used to dynamically calibrate the primary probe 26 during measurement, as will be described in greater detail below. Depending on the type of sensing application, the substrate may be a stiff or flexible printed circuit board (PCB) and the traces 26-48 may be formed between layers 52, 54 of the PCB using well-known techniques.

Each trace 26-48 has a distal tip portion 56A-56L, respectively, and a proximal connection portion 58 for electrical connection to the electronics section 12. Preferably, the traces are of diminishing length from the first trace 26 to the last trace 48 to thereby form a first space or distance 60A between the tips 56A and 56B of the traces 26 and 28; a second space 60B between the tips 56B and 56C of the traces 28 and 30; a third space 60C between the tips 56C and 56D of the traces 30 and 32; a fourth space 60D between the tips 56D and 56E of the traces 32 and 34; a fifth space 60E between the tips 56E and 56F of the traces 34 and 36; a sixth space 60F between the tips 56F and 56G of the traces 36 and 38; a seventh space 60O between the tips 56G and 56H of the traces 38 and 40; an eighth space 60H between the tips 56H and 56I of the traces 40 and 42; a ninth space 60I between the tips 56I and 56J of the traces 42 and 44; a tenth space 60J between the tips 56J and 56K of the traces 44 and 46; and an eleventh space 60K between the tips 56K and 56L of the traces 46 and 48. The spaces 60A-60K are preferably of equal dimension to facilitate level determination. However, it will be understood that the spaces may have different dimensions.

It will be further understood that the provision of twelve traces is by way of example only since more or less antenna probes may be provided. For example, when the type of flowable material to be measured is known and does not change in material properties, and when environmental factors affecting the accuracy of the measurement are known, such as temperature and humidity, it may be possible to use a single antenna probe for accurate level determination with environmental factors being resolved by the electronics section 12. In accordance with the present invention, a single antenna probe may be formed on a stiff or flexible PCB or be embodied as an insulated electrical wire that connects to the electronics section 12 or any other electrically conductive material with an insulative sheath.

When the material to be measured is unknown, or when a known material undergoes unknown or unanticipated property changes, the provision of two or more antenna probes is preferable, with accuracy of measurement increasing proportionately with the number of antenna probes provided. By way of example only, when the capacitive transducer 10 of the present invention is installed in a fuel tank of a motor vehicle, it would be very difficult to anticipate the type of fuel that would be in the tank because of variations in dielectric constant and density which are affected by temperature, humidity, pressure, fuel formulations, additives, and octane levels from different manufacturers. In addition, the operator may choose to add other substances to the fuel tank in an attempt to increase fuel economy, boost octane level, and/or reduce the presence of moisture within the tank. Similar uncertainties may also be encountered when measuring the coolant level, oil level, as well as other fluid levels of a motor vehicle, stationary equipment and other systems and components where the measurement of liquid level is desirous.

It will be understood that the present invention is not limited to the particular arrangement shown and described but includes other arrangements such as traces formed on a single layer PCB or multiple traces formed on different layers of a multi-layer PCB to increase the trace density and reduce the probe section footprint. In accordance with a further embodiment of the invention, the probe section 14 may be constructed of one or more solid or stranded conductive wires surrounded by one or more insulating layers. Where a plurality of antenna probes are used, the antenna probes may be embodied as an electrical cable having a plurality of electrically isolated conductive wires.

Figure 5:
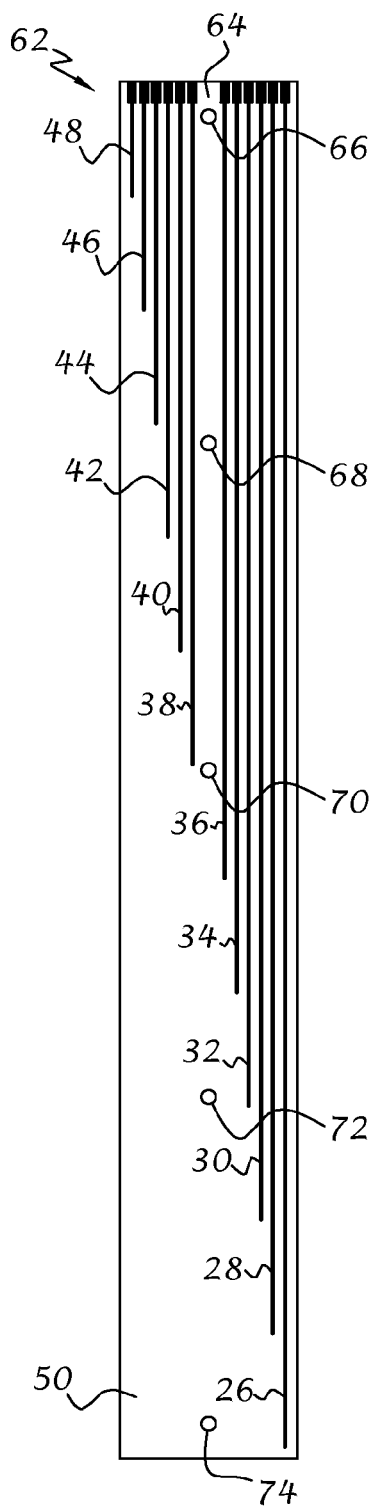
FIG. 5 is a front elevational view of a probe section in accordance with a further embodiment of the invention.

Referring to FIG. 5, a probe section 62 in accordance with a further embodiment of the invention is illustrated. The probe section 62 is similar in construction to the probe section 14 previously described, with the exception that a gap 64 is located between the antenna probes 36 and 38. A series of holes 66, 68, 70, 72, and 74 are formed in the substrate 50 for receiving fasteners (not shown) such as rivets, screws, bolts or the like for mounting the probe section 62 to a frame (not shown) or other support. It will be understood that other mounting arrangements can be used for installing the probe section 62 within a tank or the like.

Referring again to FIG. 1, the electronics section 12 preferably includes a PCB 76 with a touch-sensitive module 78 connected to the antenna probes 26-48 of the probe section 14 via I/O ports 95, a power conditioning module 80 that interfaces between the power supply 22 and the touch-sensitive module 80, and a signal conditioning module 82 that interfaces between the display/control circuitry 24 and the touch-sensitive module 78. The power conditioning module 78 can include various electronic components (not shown) in a well-known manner to regulate power from the power supply 22 and meet requirements of original equipment manufacturers (OEM's) to filter noise, spikes and other electrical anomalies that may negatively affect operation of the electronics section 12. It will be understood that the power conditioning module 80 can be eliminated and/or replaced with appropriate electronics in the touch-sensitive module 78 depending on the particular measurement application and features of the touch-sensitive module.

The signal conditioning module 82 can include electrical components (not shown) for interfacing with the display 24 in a well-known manner and/or control circuitry for operating a pump, alarm, and so on. The signal conditioning module is of well-known construction and therefore will not be further described.

As shown in FIG. 2, the touch-sensitive module 78 is preferably embodied as a programmable System-on-Chip (SoC) device that is normally associated with capacitive-type touch sensitive devices, such as touch-screens and touch-controls, for detecting movement and/or position of a finger or stylus. Such chips are currently used for touch sensitive displays and controls associated with phones, personal digital assistants (PDA's), portable music players, and the like. Due to popularity and the sheer numbers of these chips available from various manufacturers, they are extremely cost-effective when compared to other systems having individual components. This is especially important in the transportation industry where there has been a long-felt need for low-cost, liquid level sensors that deliver accurate readings independent of liquid type and environmental factors.

The SoC device preferably includes a chip with I/O ports 95, an integrated processor 84, memory 86 connected to the processor, and a plurality of oscillator circuits 88 (only one shown) connected between different ports 89 of the processor and the I/O ports 95, which are in turn connected to the antenna probes 26-48. Preferably, the number of oscillator circuits 88 is equal to or greater than the number of antenna probes being monitored. Each oscillator circuit 88 is multiplexed by the processor 84 so that a separate measurement can be determined for each antenna probe without interference from the other antenna probes. The memory 86 preferably includes both volatile memory, such as RAM, and non-volatile memory, such as EEPROM, for programming functions and data storage.

Each oscillator circuit 88 is identical in construction and therefore will be described as it applies to the antenna probe 26, it being understood that identical circuits would also be associated with the remaining antenna probes. The oscillator circuit 88 is preferably in the form of a relaxation oscillator that includes a charging current source 90 and a comparator 92 with a reset switch 94. The comparator 92 has two analog voltage inputs (labeled positive and negative) and a single digital output 96 having on and off states. The internal chip power, the comparator's positive input and an I/O port 95 (FIG. 1) of the module 78 are connected to the positive end of the charging capacitor, in this case the connection end 58 of the antenna probe 26. Only internal chip power is connected to the comparator's negative input, thus providing a threshold voltage for comparison purposes. The reset switch 94, which may be in the form of an embedded FET or other switching device, temporarily connects the positive end 58 of the charged antenna probe 26 to ground when actuated to ensure complete discharge of the antenna probe 26 prior to each charging cycle. With these components in place, the electronics section 12 is ready to begin reading and evaluating the external capacitive antenna probes attached to each of its input pins. Again, although twelve antenna probes are shown, it will be understood that more or less probes and input pins may be provided. It will be further understood that a single oscillator circuit can be provided for a plurality of probes instead of plurality of oscillator circuits. With this embodiment, a multiplexer or the like can be used to sequentially obtain the probe readings through the single oscillator circuit.

More information on a suitable programmable SoC device can be found in U.S. Pat. No. 7,307,485 issued to Snyder et al., the disclosure of which is hereby incorporated by reference. Suitable touch-sensitive modules 78 are currently available from Cypress Semiconductor Corp. of San Jose, Calif. under the CY8C21 series of programmable SoC devices as well as from Texas Instruments of Dallas, Tex. and other manufacturers.

It will be understood that the touch-sensitive module 78 need not be entirely embedded in a chip but may include separate electrical components and/or systems that could be used for detecting a change in electrical properties of the antenna probe(s) as the liquid or other material being measured travels up and down the probe.

In operation, and again only referring to the antenna probe 26, when a measuring cycle is initiated on the chip's port 95 that connects with the positive end 58 of the antenna probe 26, the reset switch 94 is first closed to deplete any charges remaining on the antenna probe. Once depleted, the reset switch 94 is opened to commence charging of the antenna probe 26. As the antenna probe charges, the voltage on its positive input steadily approaches the threshold voltage on the comparator's negative input. When the charge voltage of the antenna probe 26 reaches the preset threshold voltage, the output 96 of the comparator 92 turns on the reset switch 94 to thereby close the circuit and discharge the antenna probe 26 to ground, causing the charging cycle to start over again. The antenna probe functions as one side of a capacitor plate of the relaxation oscillator which has a fixed physical area. Since the substrate insulates the internal plate (antenna) of the capacitor, the surrounding fluent material becomes the other plate of the capacitor. As the fluent material travels up the probe, the area of the oscillator's second (fluent) plate increases proportionally. In turn, the value of the capacitance or the oscillator changes which can be quantified by reading the resulting changes in the frequency of the relaxation oscillator. The varying frequency is converted to increasing or decreasing counts depending on the fluid rising or falling along the length of the probe antenna. For example, as shown in FIG. 1, the rate of the capacitance charge/discharge is greater at the material level 18A than at the level 18. Consequently, the rate of capacitive charge and discharge can be translated into counts per scan of the antenna probe. By analyzing these counts in the processor 84, the particular capacitive state of the antenna probe 26, and thus the material level, can be accurately determined.

A method for measuring liquid level is preferably embodied as a software program in the memory 86 of the touch-sensitive module 78 for providing various instructions to the processor 84. In general, the method preferably includes the steps of: 1) pre-calibrating the capacitive transducer 10 prior to immersion in a material to be measured; 2) reading the current probe values into memory; 3) determining the material level based on the currently stored probe values and the pre-calibrated probe values; 4) performing a dynamic calibration after each reading to compensate for material type, resonance, temperature and so on; and 5) repeating steps 2) through 4).

Figure 6:
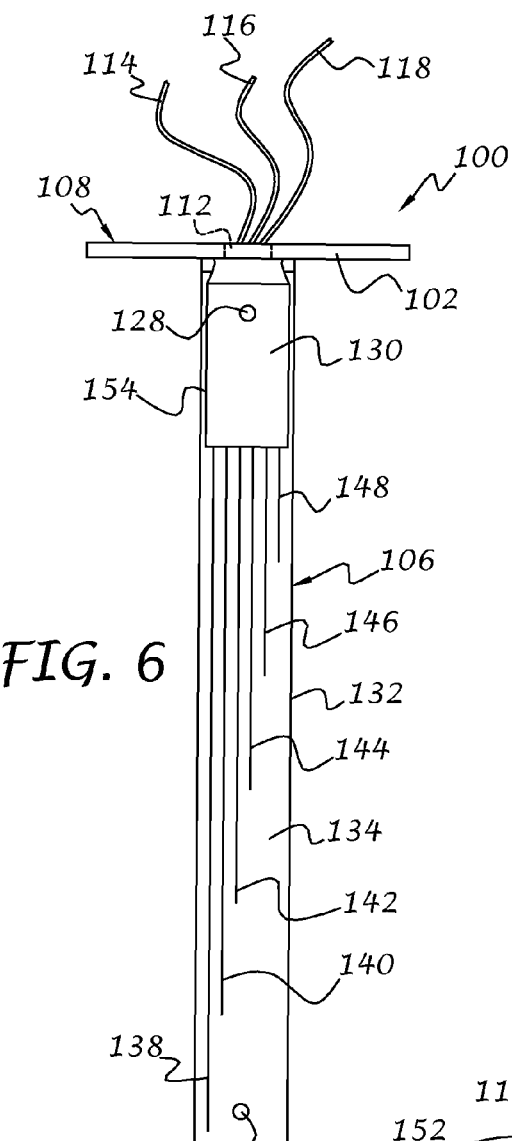
FIG. 6 is a front elevational view of a capacitive liquid level sensor assembly in accordance with another embodiment of the invention.
Figure 7:
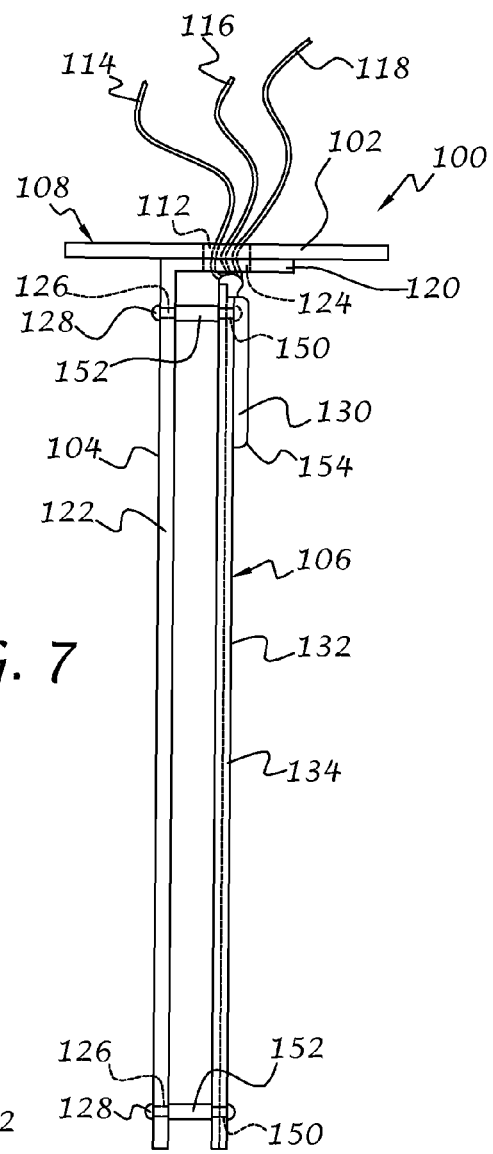
FIG. 7 is a side elevational view of the sensor assembly of FIG. 6.
Figure 8:
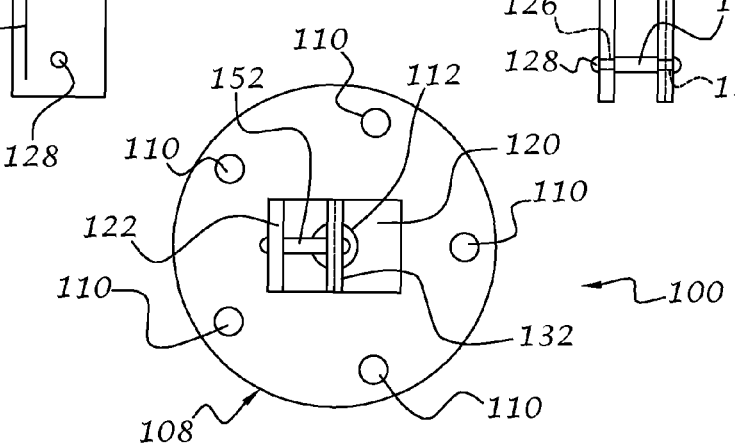
FIG. 8 is a bottom plan view of the sensor assembly of FIG. 6.

Referring now to FIGS. 6-8, a capacitive liquid level sensor assembly 100 in accordance with a further embodiment of the invention is illustrated. The sensor assembly 100 preferably includes a mounting head 102, an elongate support 104 extending downwardly from the mounting head, and a capacitive transducer 106 connected to the support 104.

As shown, the mounting head 102 is preferably in the form of a circular disk 108 with a central opening 112 and circumferentially spaced openings 110 that extend through a thickness of the disk. The disk may be formed of any suitable material including, without limitation, conductive or non-conductive plastic, metal, ceramic, and so on. The openings 110 are adapted to receive mounting bolts (not shown) or the like associated with a tank or reservoir (not shown) for securely mounting the sensor assembly 100 to the tank in a well-known manner. Electrical wires 114, 116 and 118 preferably extend through the central opening 112 for providing electrical power to the capacitive transducer 106 and sending a material level signal to a display or other control circuitry (not shown). For example, the wires 114 and 116 may conduct power and ground, respectively, while the wire 118 may conduct the material level signal.

The support 104 is preferably L-shaped in configuration with a first leg 120 secured to the mounting head 102 and a second leg 122 extending downwardly from the first leg. A central opening 124 (shown in hidden line) is formed in the first leg 120 coincident with the central opening 112 of the mounting head 102 for receiving the electrical wires 114, 116 and 118. If desired, a pass-through connector, encapsulant or the like can be located in the central opening 112 to isolate the contents of the tank from the outside environment. Spaced openings 126 (shown in hidden line in FIG. 7) are formed in the second leg 122 for receiving a fastener 128 or the like in order to connect the transducer 106 to the second leg 122. The support 104 can be constructed of any suitable material including, without limitation, conductive or non-conductive plastic, metal, ceramic, and so on.

The capacitive transducer 106 preferably includes an electronics section 130 and a probe section 132 that electrically interfaces with the electronics section. The probe section 132 is preferably constructed in a manner similar to the probe section 14 previously described, and includes a multi-layered PCB 134 with traces 138 140, 142, 144, 146, and 148 for sensing material level. It will be understood that more or less traces can be provided as previously discussed with respect to the probe section 14. Spaced openings 150 (shown in hidden line in FIG. 7) are formed in the PCB in alignment with the openings 126 of the second leg 122 for receiving the fasteners 128. Preferably, the fasteners 128 extend through standoffs or spacers 152 that are positioned between the PCB and second leg 122. However, it will be understood that the spacers can be eliminated to mount the PCB directly to the support 104 through adhesives, clamps, fasteners, or other well-known connection means.

The electronics section 130 is preferably similar in construction to the electronics section 12, with the exception that it is mounted on the same PCB as the probe section 132. A protective cover 154, such as a plastic housing, encapsulant, or the like, isolates the electronics from the surrounding fluent material to be measured.

Referring now to FIGS. 9-11, a capacitive liquid level sensor assembly 160 in accordance with a further embodiment of the invention is illustrated. The sensor assembly 160 preferably includes a mounting head 162, an elongate support 164 extending downwardly from the mounting head, and a capacitive transducer 166 connected to the support 164. The capacitive transducer 166 is preferably similar in construction to the transducer 106 previously described.

The mounting head 162 is preferably constructed of a metal material, such as brass, but may alternatively be constructed of plastic or other material. The mounting head 162 includes a mounting section 168 with external threads 170 for engagement with internal threads of a reservoir housing (not shown), which may be in the form of a tank, vessel, container or the like. The head 162 also preferably includes a securing section 172 with generally flat, external faces 174 for engagement by a wrench or the like (not shown) for installing and removing the liquid level sensor assembly 160 with respect to the reservoir housing in a well-known manner. The particular configuration of the mounting head 162 will largely depend on the mounting arrangement of the reservoir housing. Accordingly, the external threads 170 and external faces 174 may be eliminated and other mounting means may be provided. Preferably, the securing section 172 has a wall 176 with the external faces 174 formed thereon and a generally cylindrical interior cavity 178 delimited by an interior surface 180 of the wall. An annular step 182 is formed in the interior surface 180 for supporting an end cap 184.

The end cap 184 has an annular side wall portion 186 with an enlarged wall section 188 and an upper wall 190. The enlarged wall section 188 is preferably in sealing engagement with the interior surface 180 of the wall 176. An annular flange 192 of the wall 176 can be pressed, rolled or otherwise deformed over the enlarged wall section 188 to secure the end cap 184 to the securing section 172. It will be understood that other means for holding the components together can be employed, such as adhesive, welding, heat staking, and so on. Electrical wires 114, 116 and 118 from the capacitive transducer 166 exit the mounting head 162 through openings formed in the upper wall 190. It will be further understood that the end cap 184 can be replaced with encapsulating material or any other arrangement to isolate the electronics from outside conditions.

In accordance with a further embodiment of the invention, the wires and/or end cap may be replaced with a male or female plug portion with electrical connectors (not shown) for mating with a female or male plug portion (not shown), respectively, of the vehicle or system on which the liquid level sensor assembly 160 is to be installed.

The elongate support 164 preferably includes a tubular member 194 constructed of a metal material, such as aluminum, but may alternatively be constructed of plastic or other metal, ceramic or composite materials. When the tubular member 194 is constructed of an electrically conductive material, it may function as an outer plate of the capacitive transducer 166 with the material being measured functioning as the dielectric. However, it will be understood that operation of the capacitive transducer need not depend on the tubular member 194 since the or each antenna probe (traces in this embodiment), can operate independently with the material being measured as a pair of capacitor plates with the insulative layer (PCB in this embodiment) functioning as the dielectric.

The tubular member 194 preferably includes a continuous wall 196 that is generally circular in cross section to form a hollow interior 197. However, it will be understood that the tubular member 194 can be of any desired cross sectional shape such as square, rectangular, oval, and so on. A pair of projections 198 extend radially into the hollow interior 197 from an inner surface 199. A channel 200 is formed in each projection 198 for receiving opposite ends of the PCB 134 of the capacitive transducer 166. The tubular member 194 is preferably press-fit into the mounting head 162. However, it will be understood that the tubular member 194 and mounting head 162 can be connected together in any well-known manner including welding, adhesive bonding, clamping, fastening, and so on. A vent aperture 202 (FIG. 9) can be formed in the tubular member 194 to allow the ingress and egress of fluid with respect to the hollow interior 197 as the material level falls and rises in the tank or container.

Referring now to FIGS. 12-13, a capacitive liquid level sensor assembly 210 for measuring a discrete liquid level (such as a low level or high level switch point) and/or continuous liquid level in accordance with a further embodiment of the invention is illustrated. The sensor assembly 210 preferably includes a mounting head 212 and a capacitive transducer 214 installed within and extending downwardly from the mounting head.

The mounting head 212 is somewhat similar in construction to the mounting head 162 previously described, with like elements represented by like numerals. The mounting head 212 preferably has an internal annular shoulder 215 for supporting a PCB 216 that forms part of the capacitive transducer 214. A bore 218 is formed in the mounting section 168. An elongate antenna probe 220, which forms part of the transducer 214, extends through the bore and terminates at the PCB 216. An annular channel 222 surrounds the bore 218 for receiving an O-ring 224 to seal the antenna probe 220 with the mounting head 212 to thereby create a pass-through connection for the antenna probe.

The PCB 216 preferably includes electronics similar to the electronics section 12 previously described for receiving signals from the antenna probe 220. The antenna probe 220 preferably includes a single electrical conductor 226 surrounded by an electrically insulating sheath 228. The sheath 228 includes an annular side wall 229 and an end wall 230 to encapsulate the portion of the conductor 226 that will be exposed to the material being measured. In accordance with one embodiment of the invention, the electrical conductor 226 is preferably in the form of a single, relatively stiff conductive wire that terminates at the PCB 216. In accordance with a further embodiment of the invention, the electrical conductor 226 is preferably in the form of a flexible, multi-stranded conductive cable that terminates at the PCB 216. The sheath 228 can be constructed of any known insulating materials such as elastomers, plastics, ceramics, composites, and so on.

The above-described arrangement is especially suitable for measuring liquid level in high pressure and/or low temperature environments, such as propane tanks, cryogenic tanks, and so on, as well as low pressure and or highly volatile environments since the measurement electronics are completely isolated from the liquid being measured. In addition, the pass-through connection arrangement for the antenna probe 220 eliminates the need for specialized connectors when it becomes necessary to seal the contents of the tank from the electronics, thereby reducing manufacturing costs of the liquid level sensor assembly 210.

It will be understood that the antenna probe 220 need not have a bottom wall 230 when there is no need to isolate the probe from the contents being measured. In this instance, the antenna probe may simply be formed by cutting an insulated conductor wire to the appropriate length. It will be further understood that the antenna probe 220 is not limited to a single electrical conductor 226 but can be provided with multiple electrically isolated conductors for detecting multiple discrete levels (such as empty, ¼, ½, ¾, and full tank conditions) and/or continuous level with discrete calibration points, detection of different liquids and/or vapors at different heights, and so on.

Figure 14:
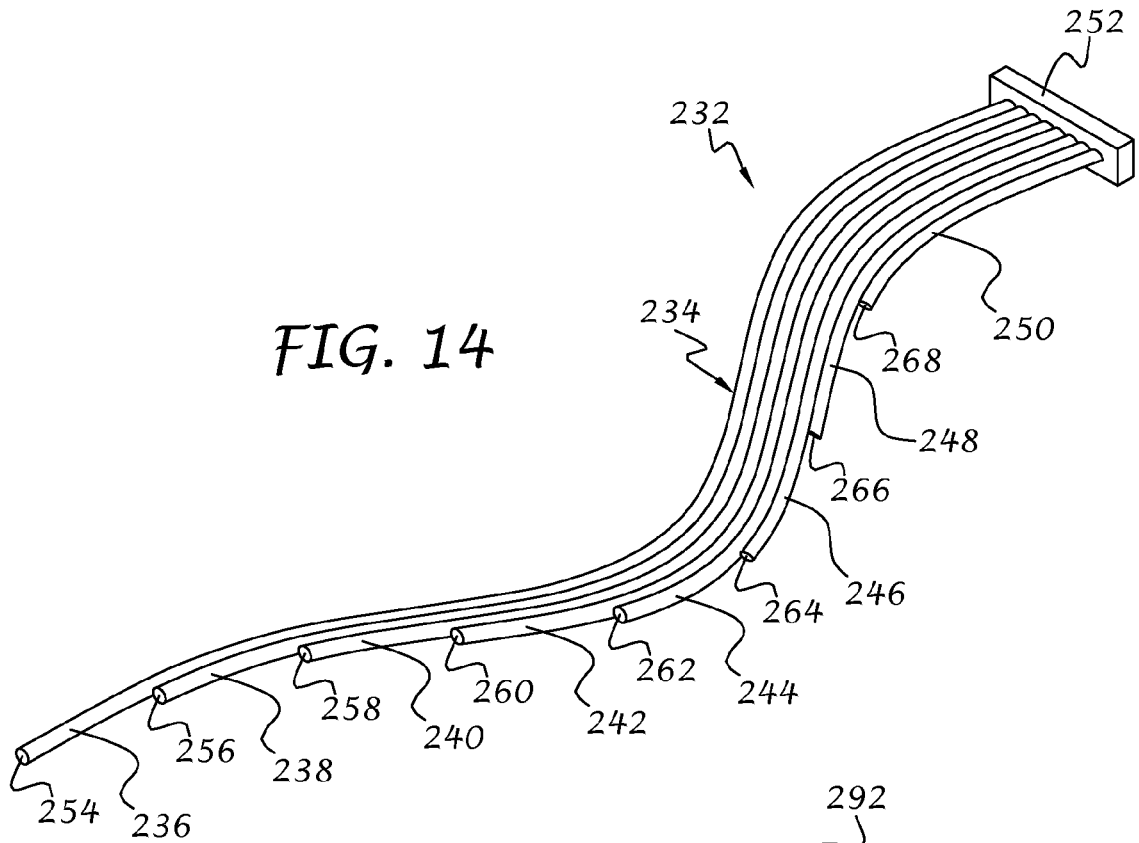
FIG. 14 is an isometric view of a flexible probe section in accordance with a further embodiment of the invention.

By way of example, and referring now to FIG. 14, a flexible probe section 232 in accordance with a further embodiment of the invention preferably includes a plurality of antenna probes formed as a generally flat ribbon cable or flex circuit 234 having a plurality of flexible, insulated conductor wires 236, 238, 240, 242, 244, 246, 248, and 250 and a connector 252 electrically connected to the proximal ends of the wires. The connector 252 preferably mates with a corresponding connector (not shown) associated with the electronics section 12 (FIG. 1). Distal tip portions 254, 256, 258, 260, 262, 264, 266, and 268 are formed at the distal ends of the wires 236, 238, 240, 242, 244, 246, 248, and 250, respectively. Preferably, the wires are of diminishing length from the first wire 236 to the last wire 250 to thereby form discrete spaces or distances between adjacent sets of tip portions. The spaces are preferably of equal dimension to facilitate level determination. However, it will be understood that the spaces may have different dimensions. It will be further understood that the provision of eight flexible antenna probes is by way of example only since more or less antenna probes may be provided. As with the previous embodiments, the multiple electrically isolated conductor wires can be used for detecting multiple discrete levels (such as empty, ¼, ½, ¾, and full tank conditions) and/or continuous level with discrete calibration points, detection of different liquids and/or vapors at different heights, and so on.

Figure 15:
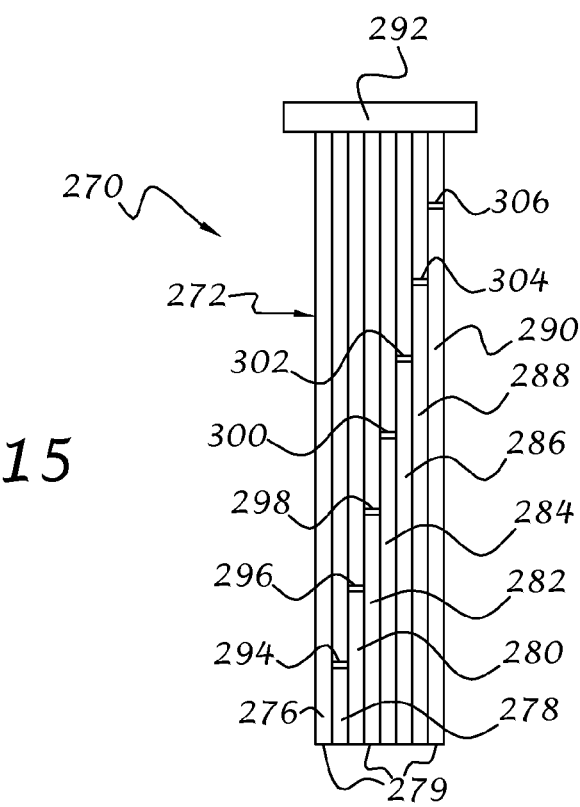
FIG. 15 is a front elevational view of a flexible probe section in accordance with an even further embodiment of the invention.

Referring now to FIG. 15, a flexible probe section 270 in accordance with an even further embodiment of the invention preferably includes a plurality of antenna probes formed as a generally flat ribbon cable or flex circuit 272 having a plurality of flexible, insulated conductor wires 276, 278, 280, 282, 284, 286, 288, and 290, and a connector 292 electrically connected to the proximal ends of the wires. As in the previous embodiment, the connector 292 preferably mates with a corresponding connector (not shown) associated with the electronics section 12 (FIG. 1). Tip portions 294, 296, 298, 300, 302, 304, and 306 are formed at the distal ends of the insulated wires 276, 278, 280, 282, 284, 286, 288, and 290, respectively, by slicing through each wire at predetermined intervals to thereby form discrete spaces or distances between adjacent sets of tip portions, while the end portions 279 of each wire below the tip portions remain intact. As in the previous embodiments, the spaces are preferably of equal dimension to facilitate level determination. However, it will be understood that the spaces may have different dimensions. It will be further understood that the provision of eight flexible antenna probes is by way of example only since more or less antenna probes may be provided. As with the previous embodiments, the multiple electrically isolated conductor wires can be used for detecting multiple discrete levels (such as empty, ¼, ½, ¾, and full tank conditions) and/or continuous level with discrete calibration points, detection of different liquids and/or vapors at different heights, and so on.

Figure 16:
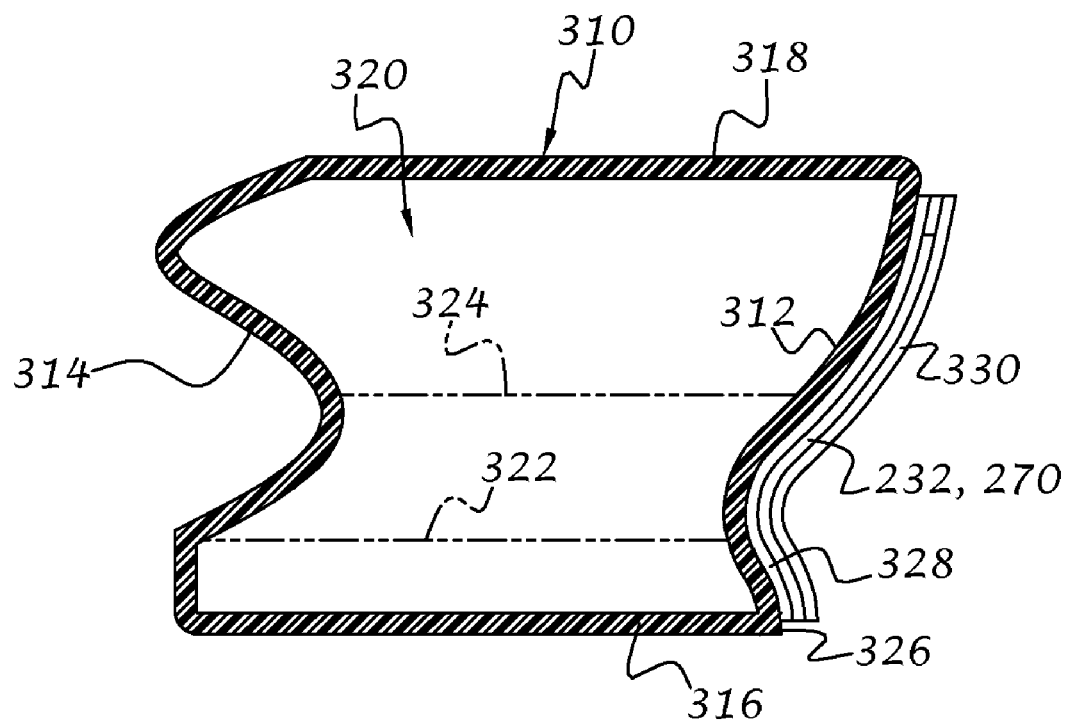
FIG. 16 is a side sectional view of a tank for holding liquid and a flexible probe section connected to a wall of the tank for measuring liquid level.

Referring now to FIG. 16, one practical application of the flexible probe sections 232 or 270 in accordance with the present invention is illustrated. A tank 310 may have one or more curved side wall sections, such as shown at 312 and 314, a bottom wall section 316 and top wall section 318 connected to the side wall sections to form a hollow interior 320 within which a liquid may be contained at different levels, as represented by phantom lines 322 and 324. In this embodiment, the tank 310 is preferably constructed of a non-conductive material, such as plastics or composites. The tank 310 may be used for storing fuel, oil, water or other liquids.

In many applications, such as all-terrain vehicles, motorcycles, snowmobiles, and the like, the curved side walls may be formed to fit around the engine and/or other components of the vehicle. In such circumstances, prior art fuel sensors are usually inadequate to accommodate these curves while accurately measuring fuel level. In addition, many tanks are constructed without the provision of openings or mounting hardware for accommodating a liquid level sensor. In other circumstances, it may be difficult or impractical to penetrate the tank with a liquid level sensor. Accordingly, a flexible probe section 232 or 270 is preferably connected to an outer surface 326 of one of the side wall sections, such as section 312, via an adhesive layer 328. In applications where the flexible probe section is exposed to environmental conditions, such as rain, humidity, road salts, mud, sleet, ice and snow, a thick insulative backing layer 330 is preferably attached to the probe section in order to minimize or eliminate inaccuracies caused by these conditions.

One application of this embodiment involves the liquid level measurement of potable water, grey water and black water in recreational vehicles and motor-coaches without creating additional openings that may eventually be prone to leakage. However, it will be understood that the present embodiment of the invention can be used in many different applications. It will be further understood that the flexible probe sections can be mounted to the inner surfaces of the tank. In this instance, the insulative backing layer 330 may not be needed.

Figure 17:
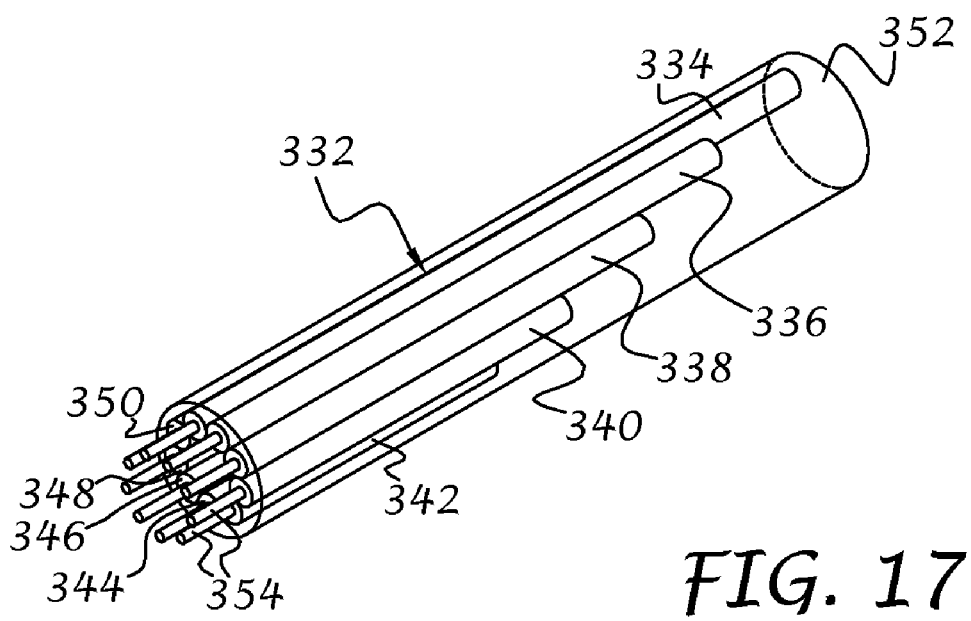
FIG. 17 is an isometric view of a flexible probe section in accordance with another embodiment of the invention.

Referring now to FIG. 17, another practical application of the flexible probe sections 232 or 270 is illustrated. As shown, a flexible probe section 332, similar in construction to the probe section 232, includes a plurality of antenna probes 334-350 of differing lengths and is rolled about its length to form a generally cylindrically-shaped probe section. The probe section is then inserted into a tube or sleeve 352 to maintain it's rolled condition. The tube or sleeve 352 can be constructed of a heat-shrink material to tightly fit around the rolled flexible probe section upon the application of heat. It will be understood that other means for maintaining the cylindrical shape includes, but is not limited to, elastic bands, clamps, adhesive bonding, melting the insulating layers together, and so on. The proximal ends 354 of the antenna probes are preferably connected to the electronics section 12 (FIG. 1), as previously described. It will be understood that the flexible probe section 270 can be rolled in the same manner as the flexible probe section 232.

With this embodiment, the flexible probe section 232, 270 is capable of insertion into small openings or tubes associated with a tank or reservoir for measuring liquid level. For example, the flexible probe section can be inserted into the dipstick tube of a transmission or engine oil reservoir for detecting oil level within the reservoir. The provision of multiple antenna probes provides both discrete measurement points to indicate high or low oil levels and continuous measurement of the oil level together with measurement compensation for oil type, temperature and other environmental conditions. It is also contemplated that one or more of the antenna probes can be used for measuring oil conditions and alerting an operator when an oil change point has been reached or when contaminants or carbon content within the oil have risen to undesirable proportions.

Figure 18:
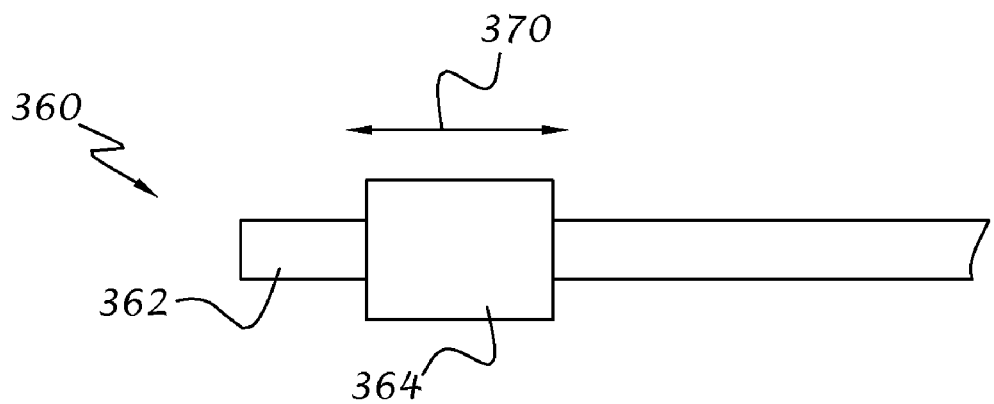
FIG. 18 is a side elevational view of a probe section in accordance with a further embodiment of the invention for measuring linear movement.
Figure 19:
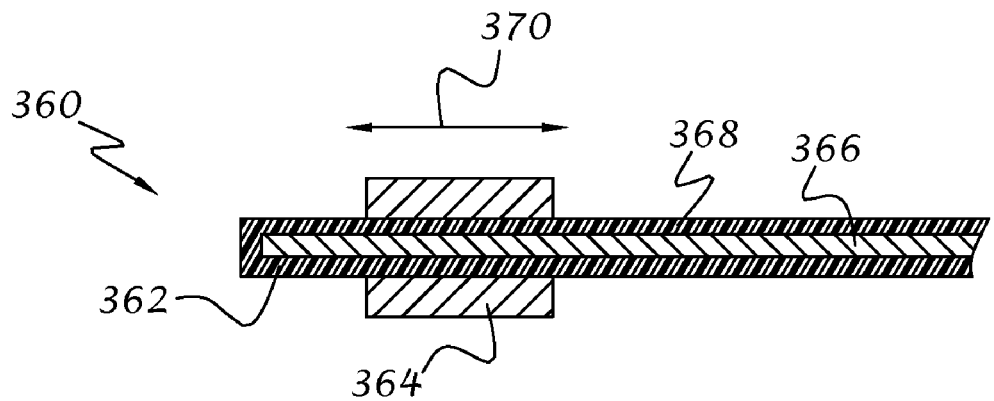
FIG. 19 is a longitudinal sectional view of the probe section of FIG. 18 with a slider in a first position.
Figure 20:
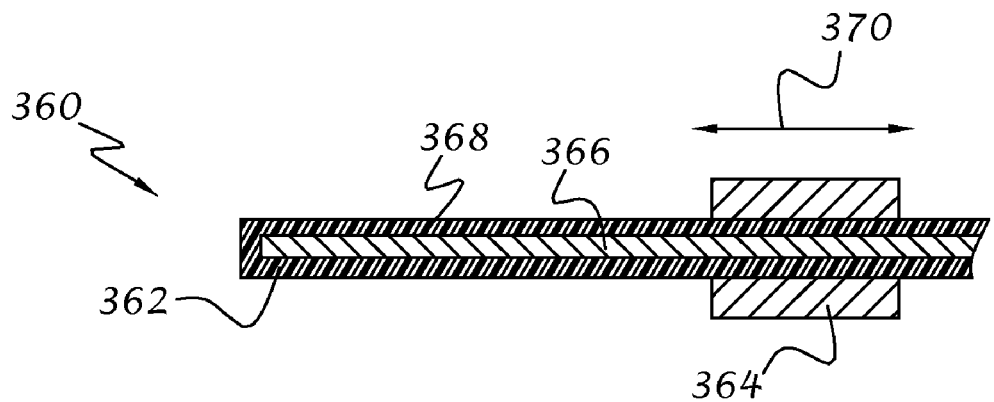
FIG. 20 is a view similar to FIG. 19 with the slider in a second position.

Referring now to FIGS. 18-20, a probe section 360 in accordance with a further embodiment of the invention for measuring linear movement preferably includes an antenna probe 362 and a movable component 364 mounted for linear sliding movement on the antenna probe. Preferably, the antenna probe 362 includes an electrically conductive core 366 in the form of a stiff rod constructed of aluminum, copper, or other conductive material, and an insulating layer 368 constructed of a material or coating with a low coefficient of friction, such as Teflon™, Tefzel™ or other fluorinated material. The movable component 364 may be constructed of a material having a predetermined property that affects the capacitance measurement of the antenna probe 362, such as dielectric or resistance values. In accordance with an exemplary embodiment of the invention, the antenna probe 362 is associated with a stationary object and the movable component 364 is associated with a movable object. As the antenna probe 362 travels along a length of the probe 362, as shown by arrows 370 in FIGS. 19 and 20, the measured capacitance of the antenna probe 362 changes, as previously described with respect to the electronics section, to give an indication of the relative position or movement between the probe 362 and component 364, and thus the relative position or movement between the objects. It will be understood that the antenna probe 362 can be associated with a movable object and the movable component 364 can be associated with a stationary object.

In accordance with a further embodiment of the invention, the probe section 360 can be used in conjunction with one or more of the embodiments of FIGS. 3, 5, 6, 14, 15, and 17 to give discrete measurement points to indicate that a particular distance has been traveled and/or continuous measurement of relative movement between the probe and movable component as well as compensation for ambient conditions and other environmental factors.

It will be understood that the term "preferably" as used throughout the specification refers to one or more exemplary embodiments of the invention and therefore is not to be interpreted in any limiting sense. It will be further understood that the term "connect" and its various derivatives as may be used throughout the specification refer to components that may be joined together either directly or through one or more intermediate members. In addition, terms of orientation and/or position as may be used throughout the specification relate to relative rather than absolute orientations and/or positions.

It will be appreciated by those skilled in the art that changes could be made to the embodiments described above without departing from the broad inventive concept thereof. It will be understood, therefore, that this invention is not limited to the particular embodiments disclosed, but is intended to cover modifications within the spirit and scope of the present invention as defined by the appended claims.

We claim:

1. A capacitive sensor assembly for measuring relative position between first and second objects, the capacitive sensor assembly comprising:
   an electronics section having a touch-sensitive module that is capable of receiving and processing signals from a capacitive touch device, the touch-sensitive module comprising a plurality of ports; and
   a probe section comprising a plurality of independently operating antenna probes of different lengths connected to a different one of the plurality of ports, each antenna probe including an elongate electrical conductor, an insulating layer covering at least a portion of the electrical conductor, and an offset tip portion representing a discrete measurement position;
   wherein the longest antenna probe is adapted for continuous measurement of level and the shorter antenna probes are adapted to modify a measurement reading at the discrete measurement positions to thereby dynamically calibrate the longest antenna probe;
   wherein a change in detected capacitance of at least one antenna probe is reflective of a change in relative movement or position between the first and second objects.

2. A capacitive sensor assembly according to claim 1, wherein the touch-sensitive module comprises a programmable System on Chip (SoC) device having a processor, a memory and at least one port operably associated with the processor, and at least one oscillator circuit connected between the at least one port and the processor such that a measured capacitance of the at least one antenna probe is translated into count values that are received by the processor for determining the relative movement or position.

3. A capacitive sensor assembly according to claim 1, wherein the touch-sensitive module comprises a plurality of discrete components.

4. A capacitive sensor assembly according to claim 1, wherein the probe section comprises a generally flat ribbon cable having a plurality of conductive wires surrounded by insulating material to thereby form the plurality of antenna probes.

5. A capacitive sensor assembly according to claim 1, wherein the probe section further comprises an insulating substrate with the antenna probes being formed as conductive traces between layers of the substrate.

6. A capacitive sensor assembly according to claim 5, wherein the insulating substrate and conductive traces are constructed of flexible materials.

7. A capacitive sensor assembly according to claim 5, wherein the electronics section is mounted on the insulating substrate of the probe section.

8. A capacitive sensor assembly for measuring relative position between first and second objects, the capacitive sensor assembly comprising:
   an electronics section having a touch-sensitive module that is capable of receiving and processing signals from a capacitive touch device; and
   a probe section having at least one elongate antenna probe connected to the touch-sensitive module, the antenna probe including an elongate electrical conductor and an insulating layer covering at least a portion of the electrical conductor;
   wherein a change in detected capacitance of the at least one antenna probe is reflective of a change in relative movement or position between the first and second objects; and further comprising a movable component slidably connected to the probe section, the movable component having at least one electrical property that causes change in capacitance measurement of the at least one antenna probe to thereby determine relative position or movement between the probe section and the movable component and thus the first and second objects.

9. A capacitive sensor assembly for measuring relative position or movement between first and second objects, the capacitive sensor assembly comprising:
   a probe section comprising a plurality of independently operating elongate antenna probes of different lengths, the antenna probes being electrically isolated from each other and including offset tip portions representing discrete measurement positions;
   wherein the longest antenna probe is adapted for continuous measurement of level and the shorter antenna probes are adapted to modify a measurement reading at the different discrete measurement positions to thereby dynamically calibrate the longest antenna probe; and
   an electronics section operably associated with the probe section for measuring changes in the individual capacitance of each antenna probe to thereby detect the relative position or movement.

10. A capacitive sensor assembly according to claim 9, wherein the electronics section is mounted on the probe section.

11. A capacitive sensor assembly according to claim 9, wherein the electronics section comprises a touch-sensitive module that is capable of receiving and processing signals from a capacitive touch device, the touch-sensitive module having a plurality of ports for receiving each of the independently operating antenna probes.

12. A capacitive sensor assembly according to claim 9, wherein the probe section further comprises an insulating substrate with the antenna probes being formed as conductive traces between layers of the substrate.

13. A capacitive sensor assembly according to claim 12, wherein the insulating substrate and conductive traces are constructed of flexible materials.

14. A capacitive sensor assembly according to claim 13, wherein the probe section further comprises an adhesive layer for connecting the probe section to the wall of a tank.

15. A capacitive sensor assembly according to claim 14, wherein the probe section further comprises a relatively thick insulating layer to at least minimize variations in measurement signals due to environmental conditions.

16. A capacitive sensor assembly according to claim 9, wherein the probe section comprises a generally flat ribbon cable having a plurality of conductive wires surrounded by insulating material to thereby form the plurality of antenna probes.

17. A capacitive sensor assembly according to claim 16 wherein each conductive wire is interrupted at the discrete measurement positions to thereby form the offset tip portions.

18. A capacitive sensor assembly according to claim 16, wherein the generally flat ribbon cable is rolled lengthwise to form a generally cylindrically shaped probe section.

* * * * *